May 31, 1960      L. L. McCOWAN      2,938,645
BABY FEEDING UTENSIL
Filed Dec. 30, 1957      2 Sheets-Sheet 1
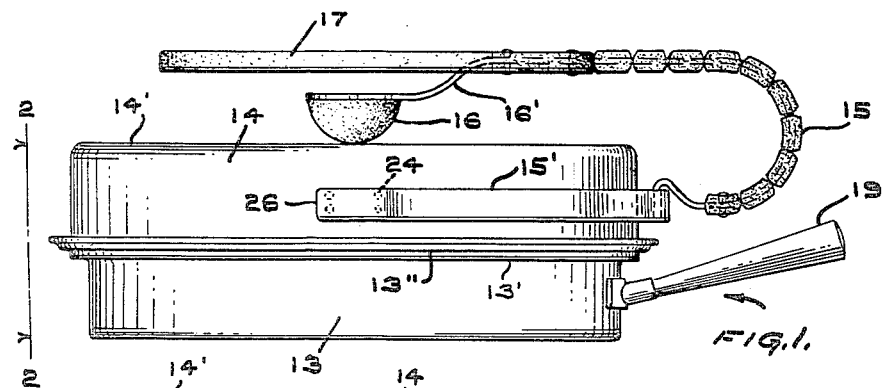
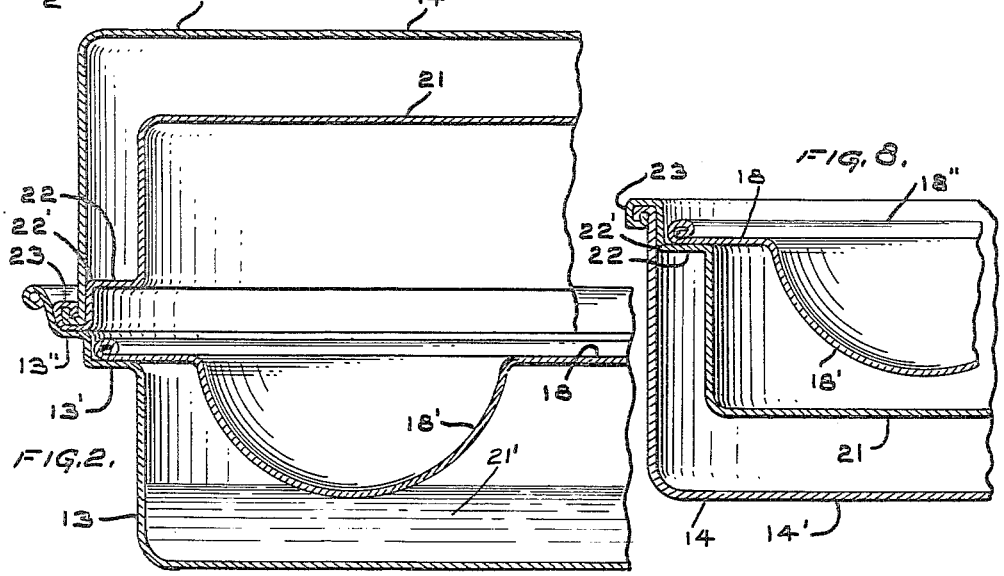
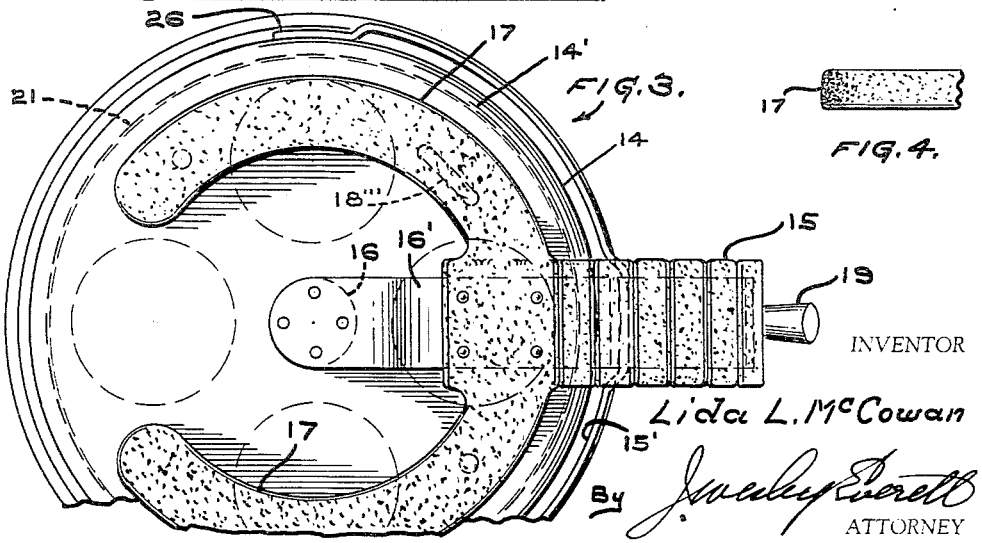
INVENTOR
Lida L. McCowan
By *J. Wesley Everett*
ATTORNEY May 31, 1960 L. L. McCOWAN 2,938,645
BABY FEEDING UTENSIL
Filed Dec. 30, 1957 2 Sheets-Sheet 2
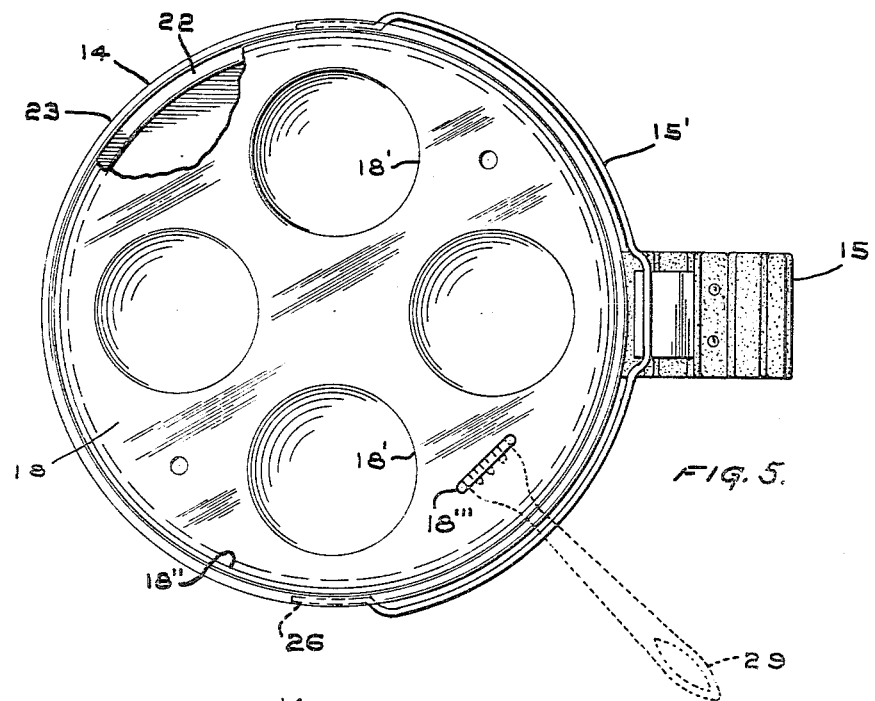
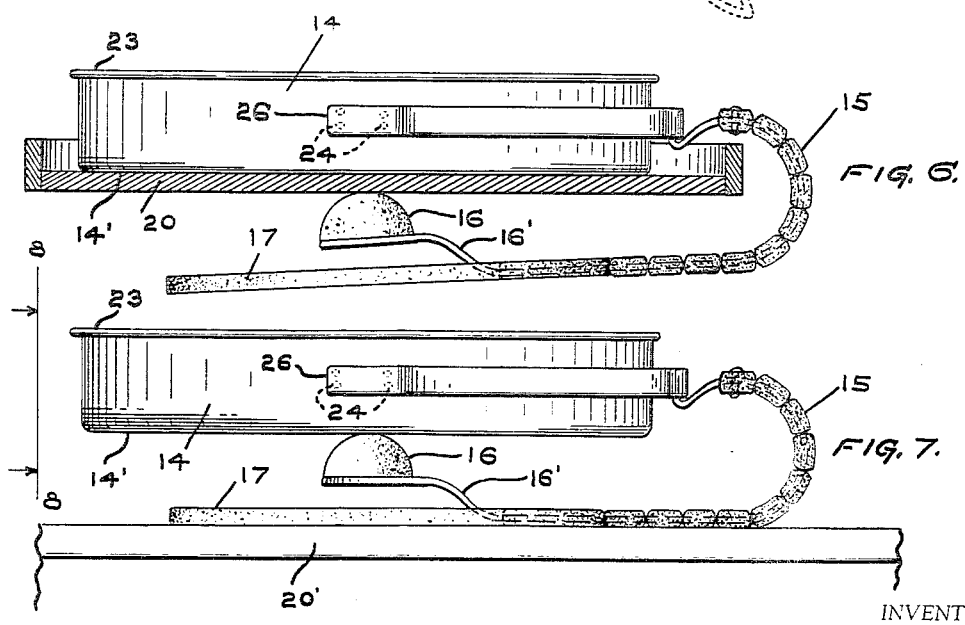
INVENTOR
Lida L. McCowan
BY J. Wesley Everett
ATTORNEY

2,938,645
BABY FEEDING UTENSIL

Lida L. McCowan, Madcap Manor, R.F.D. 1, Mars, Pa.

Filed Dec. 30, 1957, Ser. No. 706,208

1 Claim. (Cl. 220—4)

The present invention relates to an improved food heating and serving utensil for infants and in particular for infants who are in the stage of beginning to feed themselves.

One object of the invention is to provide a utensil which is convenient to both heat and serve food to small children, which is usually a warming of several prepared foods at the same time and feeding them to the child at the correct temperature.

Another object of the invention is to provide a utensil in which the food can be kept warm for the prolonged period during the time the child is being fed.

Still another object of the invention is to provide a utensil which may be detachably secured to a high chair, table or similar table top to prevent it from being pushed around or overturned by the child in attempting to dish up its food.

While several objects of the invention have been pointed out, other objects, uses and advantages of the invention will become more apparent as the nature of the invention is more fully disclosed consisting of its novel construction, combination and arrangement of parts shown in the accompanying drawings and described in the following detailed description in which:

Figure 1 is a view of the invention in side elevation including both the bottom and cover members.

Figure 2 is an enlarged fragmentary sectional view taken along line 2—2 of Figure 1.

Figure 3 is a plan view of the utensil as shown in Figure 1.

Figure 4 is an enlarged fragmentary view in elevation of the outer end of the handle member.

Figure 5 is a top plan view of the utensil with the cover removed.

Figure 6 is a view in elevation of the cover clamped to a high chair table.

Figure 7 is a view similar to Figure 6 showing the cover resting upon a table top.

Figure 8 is an enlarged fragmentary sectional view taken along line 8—8 of Figure 7 showing the food tray resting in the cover member.

In referring to the several views in the drawings, like and similar numerals will be used to designate like and similar parts throughout.

The utensil consists in general of a bottom member 13, a cover member 14, a food receiving member 18 and a U-shaped handle member 15.

The bottom member is in the form of a shallow receptacle having a flat bottom and a pair of rabbets 13' and 13" around its top. Rabbet 13' is for receiving the outer peripheral edge of the food receiving tray and is of such depth as to extend above the edge of the food tray. This will prevent it from becoming accidentally dislodged while it is being handled during the heating of the food. Attached to one side of the bottom member 13 is a conventional handle 19 for normally handling the utensil.

The cover 14 is made to fit over the bottom 13, its lower edge being adapted to fit within the second and upper rabbet 13". The cover itself is made in two parts, an outer part 14 and an inner part 21. The inner part is separated from the outer part 14 by a space about its sides and top. The lower edge of the inner cover member is offset as shown at 22 to contact the outer cover member 14 at 22', the lower edge of the cover 21 then extends downwardly along the inner surface of the cover member 14 and over its lower edge where the two lower edges of the covers are united such as by rolling into a bead 23. These two cover members are hermetically sealed for the purpose of insulating the outer cover member 14 from the heat that may be in the inner cover member when the food is being heated.

The cover is also provided with a U-shaped handle 15. The handle 15 is made up of an arcuate portion 15' extending around the cover to a point centrally of the outer cover 14, an upper portion 17 is an offset holding member 16. The portion 17 has a flat horizontal upper surface, which is in a parallel plane with the upper surface of the cover. This flat upper surface of the member 17 is extended outwardly in the form of an open circle as shown in Figure 3 to form a base upon which to rest the cover upon a table, or other surface when the top is inverted to support the food tray 18 as shown in Figure 7. Extending outwardly and downwardly from the end of the handle 15 is the member 16. This member 16 is fixed to the end of the handle 15 by the resilient member 16' and supports the member 16 at a point centrally of the cover and is carried preferably in contact therewith. The handle is secured to the cover by any convenient means such as rivets 24 and 26. The portion 15 is preferably constructed of an elastic strap material, the narrow edge being parallel with the bottom edge of the cover. Positioned about the portion 15 is an insulating material such as small individual Bakelite segments 15" to allow the cover to be removed after being heated without burning the user and to allow the flat strip to spring and clamp the cover to a table such as 20 between the upper surface of the cover and the member 16 when the cover is inverted as shown in Figure 7.

The portion 17 extending outwardly from the outer end of the handle is preferably shaped somewhat similar to the shape of the cover. In this case the utensil is round, but may be of any desirable form such as rectangular, square or the like. When the handle is in its normal position the portion 17 is substantially parallel with the outer flat surface of the cover and may be used as shown in Figure 7 for resting the cover upon a table, or the like, when the cover is being used to support the food tray.

The utensil is generally used in the following manner; when it is desired to prepare food for the child, the food container tray 18 is placed within the bottom as shown best in Figure 2. Food is placed in the several compartments 18' and the cover 14 is applied. A small amount of water 21' is normally put into the bottom member as shown in Figure 2. Heat is applied to the upper surface of the bottom member for heating the water and the food contents to a suitable temperature. When the food has been sufficiently heated, the cover is removed with one hand by the use of the handle 15, while holding the cover, it is inverted by rotating the cover and handle. With the other hand a lifter, or fork, 29 is used to remove the food tray 18 from the bottom 13 by inserting the form through the slot 18''' within the tray, placing it into inverted cover, as shown in Figure 5. The cover is then carried to a high chair and clamped to a table 20, as shown in Figure 6, or the cover may be supported upon a table or other surface as shown at 20' in Figure 7.

The edge 18″ of the food tray is received on a shoulder formed by the offset 22 of the inner member of the cover. These two co-acting members are of such dimensions that the edge 18″ of the food is below the upper edge 23 of the inverted cover. This prevents the child from being able to get his spoon or other utensil under the food tray and dislodge it, the only easy way to dislodge the tray being to insert a lifter or other suitable instrument through the slot 18‴.

The double wall feature of the cover will keep the food warm for a considerable time and will also prevent the outside member 14 from getting hot enough to burn the child or the party serving the food if it is accidentally touched.

While a single form of the invention has been illustrated and described in detail, it is not intended as a limitation of the invention as the scope of the invention is best defined in the appended claim.

I claim:

A combination infant food heating and serving utensil comprising, a bottom member having a food supporting tray supported by the bottom member within a recess adjacent its upper and outer edge, a cover member for said bottom member having an inner and outer shell and a flat upper surface, the height of the inner shell being greater than the depth of the food tray and an off-set on the inner shell adjacent its lower edge extending outwardly to contact the outer shell of the cover along a narrow band extending from the lower edge of the outer shell upwardly for a predetermined distance, the inner shell extending downwardly along the inner edge of the outer shell and over its lower edge where the lower edge of the shell is hermetically sealed to the inner edge of the inner shell, the bottom member having a second recess located above and outwardly from the first mentioned recess for receiving the lower edge of the cover, a U shaped handle having means for securing one and to the sides of the cover, the handle extending rearwardly from the cover and backward over the flat upper surface of the cover, the outer end of the handle being extended in a horizontal plane to substantially the same size as the said upper surface of the cover and parallel thereto, a clamping element attached to one end of a resilient arm, the other end of the arm being attached to the portion of the handle etxending backward over the flat upper surface of the cover and positioning the clamping element centrally of the cover for clamping the same to a support when the cover is inverted.

References Cited in the file of this patent

UNITED STATES PATENTS

| | | |
|---|---|---|
| 845,325 | Zorn | Feb. 26, 1907 |
| 1,177,728 | Snyder et al. | Apr. 4, 1916 |
| 1,202,816 | Drake | Oct. 31, 1916 |
| 1,424,348 | Farber | Aug. 1, 1922 |
| 2,832,331 | Schwank | Apr. 29, 1958 |